United States Patent
Kim et al.

(10) Patent No.: US 7,924,939 B2
(45) Date of Patent: Apr. 12, 2011

(54) POWER TRANSMISSION APPARATUS IN WIRELESS COMMUNICATION SYSTEMS

(75) Inventors: Han-Seok Kim, Seoul (KR); Jin-Sung Kim, Yongin-si (KR); Bum-Man Kim, Pohang-si (KR)

(73) Assignees: Samsung Electronics Co., Ltd., Suwon-si (KR); Postech Foundation, Pohang-si (KR)

( * ) Notice: Subject to any disclaimer, the term of this patent is extended or adjusted under 35 U.S.C. 154(b) by 636 days.

(21) Appl. No.: 12/031,891

(22) Filed: Feb. 15, 2008

(65) Prior Publication Data
US 2008/0198944 A1    Aug. 21, 2008

(30) Foreign Application Priority Data
Feb. 15, 2007    (KR) .................. 10-2007-0015728

(51) Int. Cl.
*H04L 27/00* (2006.01)
(52) U.S. Cl. ...................................... 375/295
(58) Field of Classification Search .............. 375/295, 375/297, 300, 302, 312; 455/68, 102, 114.3; 348/442
See application file for complete search history.

(56) References Cited

U.S. PATENT DOCUMENTS

| 5,251,330 | A | 10/1993 | Chiba et al. |
| 6,449,465 | B1 * | 9/2002 | Gailus et al. ................. 455/126 |
| 7,116,947 | B2 | 10/2006 | Tanabe et al. |
| 7,395,039 | B2 * | 7/2008 | Akizuki et al. ............ 455/127.2 |
| 7,541,865 | B2 * | 6/2009 | Uchiyama et al. .............. 330/10 |
| 7,751,496 | B2 * | 7/2010 | Ahmed ......................... 375/297 |
| 2005/0202789 | A1 * | 9/2005 | Tanabe et al. ................ 455/110 |

FOREIGN PATENT DOCUMENTS

| JP | 3-34709 | 2/1991 |
| JP | 03-034709 A | 2/1991 |
| JP | 2005-277559 | 10/2005 |
| JP | 2005-277559 A | 10/2005 |

* cited by examiner

*Primary Examiner* — Sam K Ahn
(74) *Attorney, Agent, or Firm* — Jefferson IP Law, LLP

(57) ABSTRACT

An envelope elimination and restoration power transmission apparatus in a wireless communication system is provided. The apparatus comprises a signal processor for dividing a transmission signal into a size component and a phase component and for generating a control signal for controlling a current of a bias modulator according to the size component, the bias modulator for amplifying the size component according to the control signal supplied from the signal processor, for lowering an impedance characteristic of the amplified size component and for outputting the amplified size component, a frequency modulator for modulating the phase component into a radio frequency (RF) signal, and a power amplifier for amplifying the RF signal by using an output signal of the bias modulator as a bias voltage. As provided, the transmission apparatus reduces a memory effect due to an impedance difference in a modulation frequency band.

20 Claims, 4 Drawing Sheets

POWER TRANSMISSION APPARATUS IN WIRELESS COMMUNICATION SYSTEMS

PRIORITY

This application claims the benefit under 35 U.S.C. §119(a) of a Korean patent application filed in the Korean Intellectual Property Office on Feb. 15, 2007 and assigned Serial No. 2007-15728, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd. and 2) POSTECH Foundation.

BACKGROUND OF THE INVENTION

1. Field of the Invention

The present invention relates to an apparatus for a high efficiency power transmitter in a wireless communication system. More particularly the present invention relates to an apparatus for enhancing performance of an envelope elimination and restoration (EER) power transmitter in a wireless communication system.

2. Description of the Related Art

Recently, with the development of mobile communication technologies, various multi-media services in a wireless environment are being provided. To provide these multi-media services, a wireless communication system requires a high efficiency power transmitter. A high efficiency power transmitter is required for processing the large amount of data that is generated by the multi-media services.

Two important characteristics of a power transmitter in a wireless communication system are linearity and efficiency. However, it is difficult to satisfy both of these characteristics of a general power transmitter simultaneously. That is, because of a tradeoff relationship between the linearity and the efficiency of a power transmitter, satisfying one characteristic leads to a poor result regarding the other characteristic.

A wireless communication system can satisfy the above two characteristics of the power transmitter by using an envelope elimination and restoration (EER) power transmitter. As shown in FIG. 1, a conventional EER power transmitter divides a transmission signal into a size component and a phase component. The EER amplifies a size of a radio frequency (RF) signal for the phase component, thereby reducing distortion of an amplifier itself and enabling high efficiency amplification. In this case, the EER power transmitter uses the size component of the transmission signal as an output bias voltage of an amplifier which amplifies a size of the RF signal for the phase component. Therefore, it can restore the amplified transmission signal just by amplifying the RF signal for the phase component.

FIG. 1 is a diagram illustrating a conventional EER power transmitter.

As shown in FIG. 1, a conventional EER power transmitter comprises a signal divider 100, a size amplifier 110, an orthogonal modulator 120, a local oscillator 130 and a high efficiency amplifier 140.

The signal divider 100 divides a transmission signal of the EER power transmitter into a size component and a phase component. The signal divider 100 transmits the size component to the size amplifier 110 and outputs the phase component to the orthogonal modulator 120.

The size amplifier 110 amplifies the size component supplied from the signal divider 100 and outputs the amplified size component to the high efficiency amplifier 140.

The orthogonal modulator 120 modulates and outputs the phase component supplied from the signal divider 100 into an RF signal according to an RF carrier supplied from the local oscillator 130.

The local oscillator 130 generates the RF carrier for modulating the phase component into the RF signal and provides the RF carrier to the orthogonal modulator 120.

The high efficiency amplifier 140 amplifies a size of the RF signal supplied from the orthogonal modulator 120 by using a size signal supplied from the size amplifier 110 as an output bias voltage. In this case, since the high efficiency amplifier 140 amplifies the RF signal of the phase component supplied from the orthogonal modulator 120, it can amplify the RF signal without distortion thereof.

As described above, since the amplifier of a conventional EER power transmitter in a wireless communication system amplifies the phase component by using the size component as an output bias voltage of the amplifier, it can satisfy both efficiency and linearity of the power transmitter simultaneously.

Accordingly, a performance of a conventional EER power transmitter is determined by the high efficiency amplifier and a bias modulator which generates a bias voltage of the high efficiency amplifier.

That is, the linearity and efficiency of the bias modulator, i.e., the size amplifier, directly affects the linearity and efficiency of a conventional EER power transmitter. For instance, the size amplifier uses a high output voltage in order to make the high efficiency amplifier restore a peak to average ratio (PAR) and maintain linearity. In this case, the size amplifier has a problem in that efficiency decreases due to the high output voltage.

When the size component of a transmission signal is amplified in the size amplifier, the high efficiency amplifier has high impedance in a modulation frequency band of the output bias voltage supplied from the size amplifier. Hence, the high efficiency amplifier has a problem of a memory effect due to an impedance difference in the modulation frequency band.

SUMMARY OF THE INVENTION

An aspect of the present invention is to address at least the above-mentioned problems and/or disadvantages and to provide at least the advantages described below. Accordingly, an aspect of the present invention is to provide an apparatus for enhancing a performance of a power transmitter in a wireless communication system.

Another aspect of the present invention is to provide an apparatus for enhancing a performance of an envelope elimination and restoration (EER) power transmitter in a wireless communication system.

Still another aspect of the present invention is to provide an apparatus for improving a performance of an EER power transmitter by enhancing a performance of a bias modulator in a wireless communication system.

Still a further aspect of the present invention is to provide an apparatus for enhancing a performance of the EER power transmitter by lowering an output current and an impedance of a bias modulator in a wireless communication system.

According to an aspect of the present invention, a power transmission apparatus in a wireless communication system is provided. The apparatus comprises a signal processor for dividing a transmission signal into a size component and a phase component and for outputting the size component and the phase component, a bias modulator for amplifying the size component, for lowering an impedance characteristic of the amplified size component and for outputting the amplified size component, a frequency modulator for modulating the phase component into a radio frequency (RF) signal and a power amplifier for amplifying the RF signal by using an output signal of the bias modulator as a bias voltage.

According to another aspect of the present invention, a power transmission apparatus in a wireless communication system is provided. The apparatus comprises a signal processor for dividing a transmission signal into a size component and a phase component and for generating a control signal for controlling a current of a bias modulator according to the size component, the bias modulator for amplifying the size component according to the control signal supplied from the signal processor, for lowering an impedance characteristic of the amplified size component and for outputting the amplified size component, a frequency modulator for modulating the phase component into a radio frequency (RF) signal, and a power amplifier for amplifying the RF signal by using an output signal of the bias modulator as a bias voltage.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. While definitions for certain words and phrases are provided throughout this patent document, those of ordinary skill in the art should understand that in many, if not most instances, such definitions apply to prior, as well as future uses of such defined words and phrases.

Figure 1:
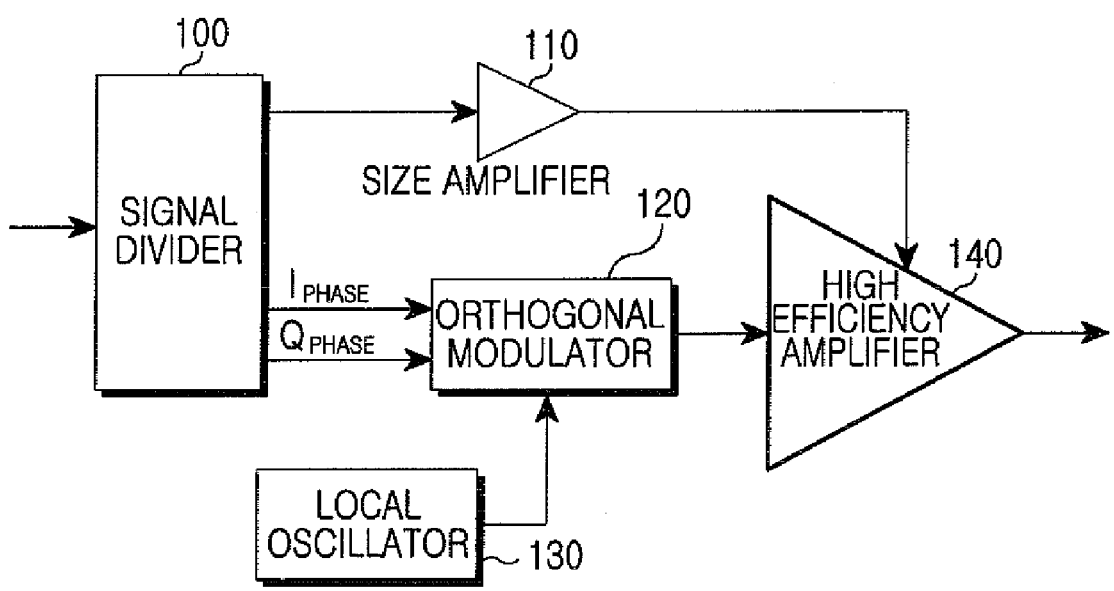
FIG. 1 is a diagram illustrating a conventional envelope elimination and restoration (EER) power transmitter.
Figure 2:
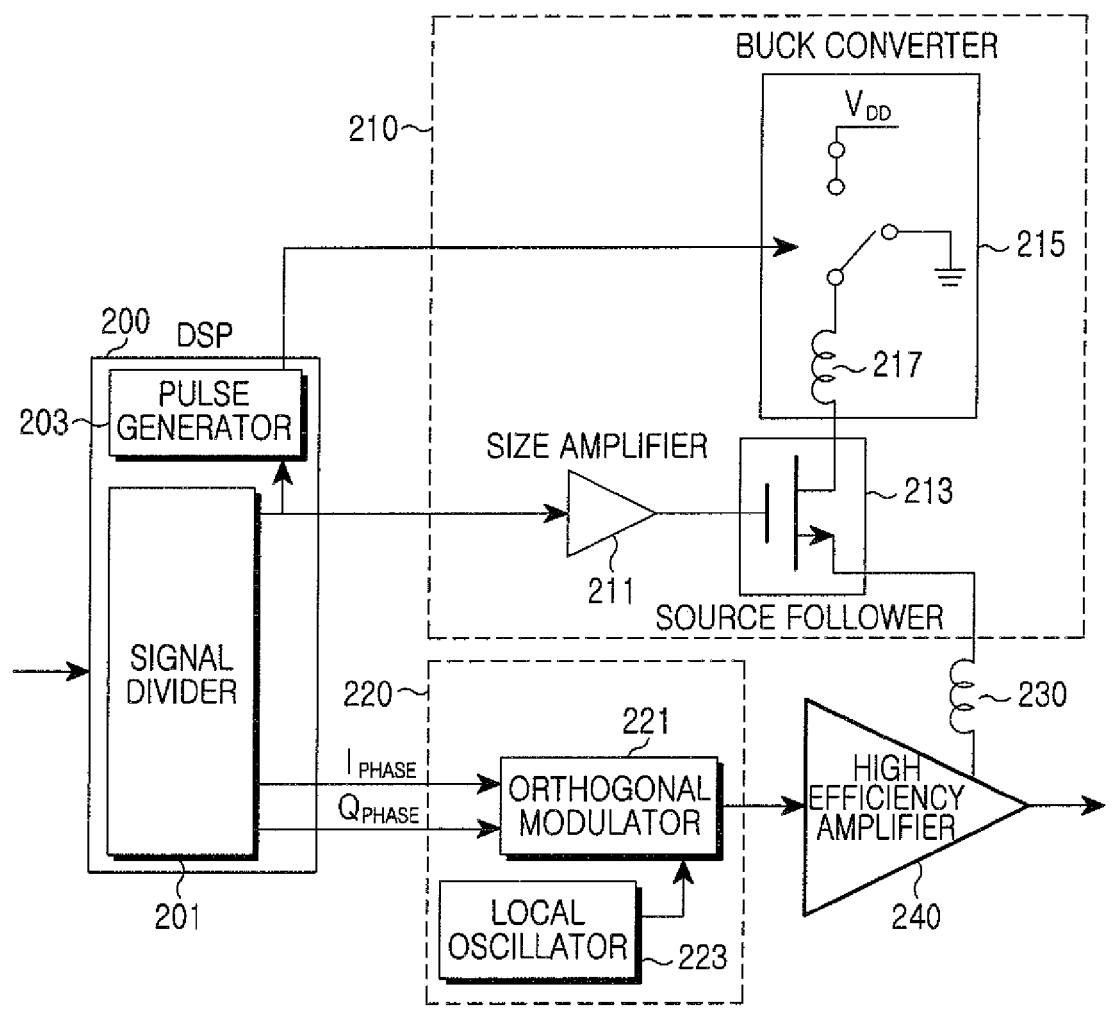
FIG. 2 is a diagram illustrating a configuration of an EER power transmitter according to an exemplary embodiment of the present invention.
Figure 3:
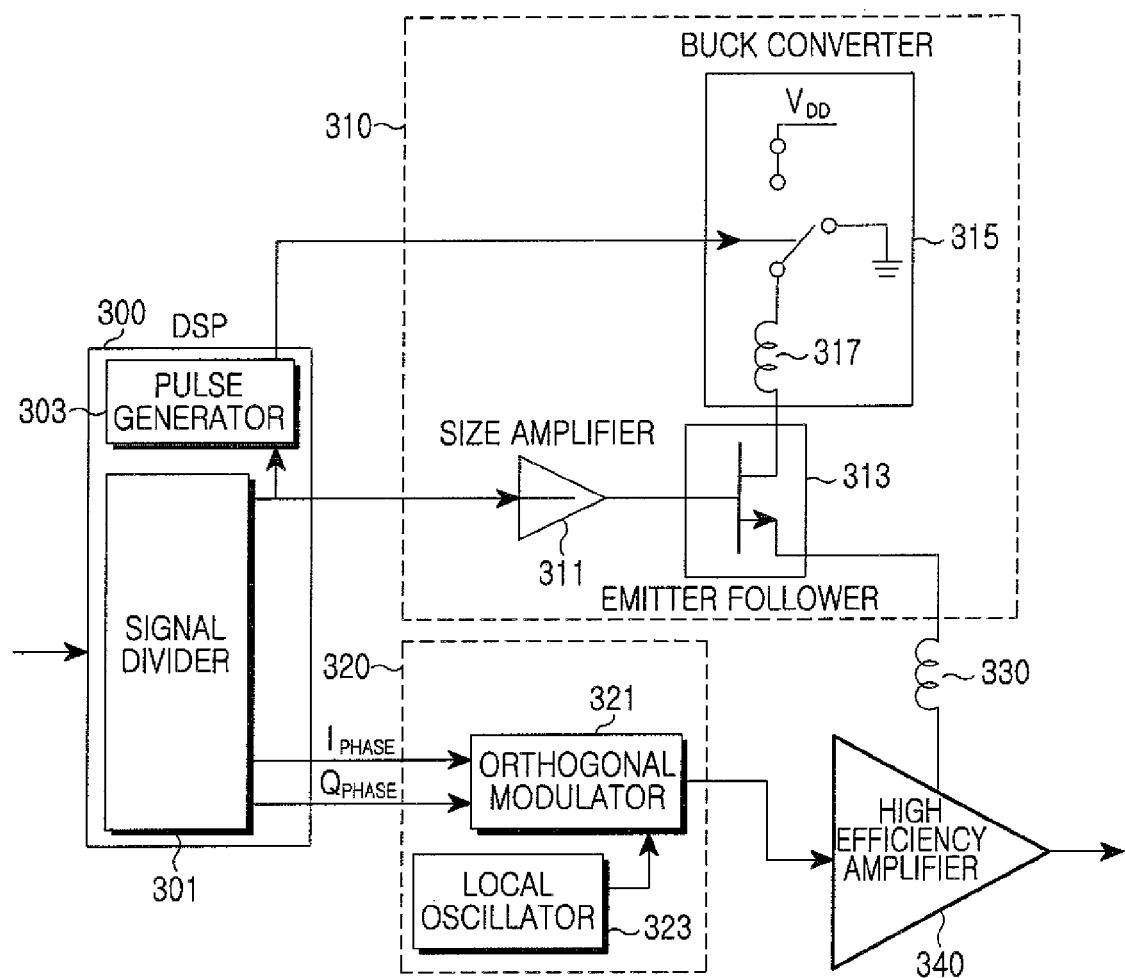
FIG. 3 is a diagram illustrating a configuration of an EER power transmitter according to another exemplary embodiment of the present invention.
Figure 4:
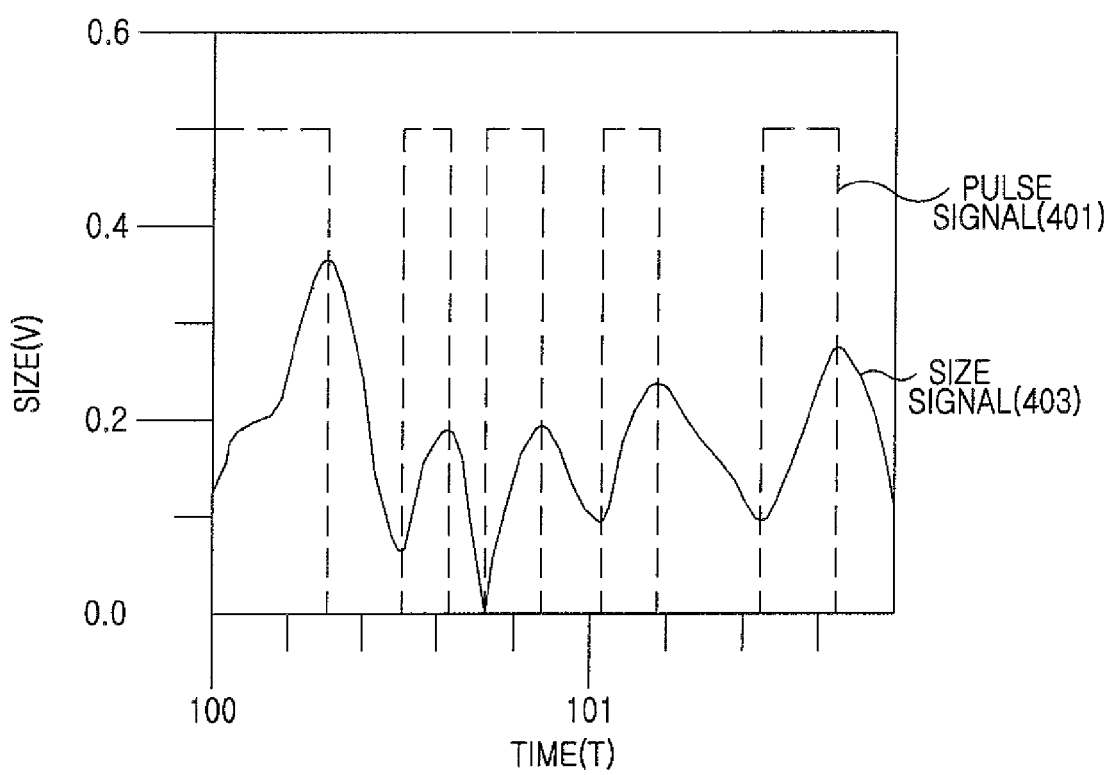
FIG. 4 is a graph illustrating a pulse signal according to an exemplary embodiment of the present invention.

FIGS. 2 through 4, discussed below, and the various exemplary embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a description will be made of a technique for enhancing the performance of an envelope elimination and restoration (EER) power transmitter by improving linearity and efficiency of a bias modulator in a wireless communication system.

FIG. 2 is a diagram illustrating a configuration of an EER power transmitter according to an exemplary embodiment of the present invention.

As shown in FIG. 2, the EER power transmitter comprises a digital signal processor 200, a bias modulator 210, a frequency modulator 220, a radio frequency (RF) choke 230 and a high efficiency amplifier 240.

The digital signal processor 200 comprises a signal divider 201 and a pulse generator 203.

The signal divider 201 divides a transmission signal of the EER power transmitter into a size component and a phase component. In an exemplary implementation, the signal divider 201 outputs the size component to the bias modulator 210 and to the pulse generator 203, and outputs the phase component to the frequency modulator 220. Here, since the signal divider 201 is configured to be included in the digital signal processor 200, it divides the size component and the phase component by using a digital signal. In another exemplary embodiment, the signal divider 201 may divide the transmission signal into a size component and a phase component by using an analog circuit.

The pulse generator 203 generates a pulse signal according to the size component supplied from the signal divider 201 and outputs it to the bias modulator 210. For example, the pulse generator 203 generates a pulse signal as shown in FIG. 4 according to the size component supplied from the signal divider 201.

FIG. 4 is a graph illustrating a pulse signal according to an exemplary embodiment of the present invention. Here, a horizontal axis refers to time information and a vertical axis denotes size information of the transmission signal. In the illustrated example of FIG. 4, the units of time for the horizontal axis are arbitrary.

As shown in FIG. 4, the pulse generator 203 generates a pulse signal 401 having a high output if a slope of a size signal 403 generated according to the size component of the transmission signal is greater than 0, whereas the pulse generator 203 generates a pulse signal 401 having a low output if the slope of the size signal 403 is smaller than 0.

The bias modulator 210 comprises a size amplifier 211, a source follower 213, a buck converter 215 and an inductor 217.

The size amplifier 211 amplifies the size component supplied from the signal divider 201 and outputs the amplified size component to the source follower 213.

The source follower 213 lowers an impedance characteristic of a signal supplied from the size amplifier 211 by using a current supplied from the buck converter 215 as a drain bias and outputs the signal having a lowered impedance characteristic. That is, the source follower 213 reduces an impedance characteristic of the output voltage and thereby lowers an impedance characteristic of a modulation frequency band of the high efficiency amplifier. Therefore, the high efficiency amplifier 240 can reduce a memory effect which is generated due to an impedance difference in the modulation frequency band.

The buck converter 215 selectively supplies a current to the source follower 213 according to the pulse signal supplied from the pulse generator 203. For example, if a high signal is input from the pulse generator 203, the buck converter 215 supplies power supply current $V_{DD}$ to the source follower 213 so that the high efficiency amplifier 240 can restore a peak to average ratio (PAR) of the transmission signal. That is, the buck converter 215 supplies a current to the source follower 213 by switching to be connected to the power supply voltage $V_{DD}$ during a period in which the size component is increasing, i.e., a period in which a high signal is input, thereby enhancing an efficiency of the size amplifier 211.

Meanwhile, if a low signal is input from the pulse generator 203, the buck converter 215 does not supply the current $V_{DD}$ to the source follower 213 in order to enhance an efficiency of the EER power transmitter. That is, the buck converter 215 is switched to be connected to ground GND during a period in which the size component is decreased, i.e., a period in which a low signal is input, thereby supplying a current, which is stored in the inductor 217 to the source follower 213.

Accordingly, the bias modulator 210 amplifies a signal of low output power by using the size amplifier 211 and amplifies a signal of high output power by using a power supply current supplied from the buck converter 215.

The RF choke 230 connects the bias modulator 210 to the high efficiency amplifier 240 so that the high efficiency amplifier 240 can use a signal output from the bias modulator 210 as a bias voltage. In this case, the RF choke 230 is configured as an inductor in order to prevent the RF signal of the high efficiency amplifier 240 from flowing into the bias modulator 210.

The frequency modulator 220 comprises an orthogonal modulator 221 and a local oscillator 223.

The orthogonal modulator 221 modulates the phase component supplied from the signal divider 201 into an RF signal according to an RF sub-carrier supplied from the local oscillator 223.

The local oscillator 223 generates the RF sub-carrier for modulating the phase component into the RF signal in the orthogonal modulator 221.

The high efficiency amplifier 240 amplifies and outputs the RF signal supplied from the frequency modulator 220 by using the size signal supplied from the bias modulator 210 as an output bias voltage. In this case, since the high efficiency amplifier 240 amplifies the RF signal of the phase component supplied from the frequency modulator 220, it can amplify the RF signal without distortion from the high efficiency amplifier 240 itself. In addition, since the high efficiency amplifier 240 amplifies the phase component supplied from the frequency modulator 220 by using the size information supplied from the bias modulator 210 as a bias voltage, it can restore the transmission signal, the size component of which is amplified.

FIG. 3 is a diagram illustrating a configuration of an EER power transmitter according to another exemplary embodiment of the present invention.

As shown in FIG. 3, the EER power transmitter comprises a digital signal processor 300, a bias modulator 310, a frequency modulator 320, an RF choke 330 and a high efficiency amplifier 340.

The digital signal processor 300 comprises a signal divider 301 and a pulse generator 303.

The signal divider 301 divides a transmission signal of the EER power transmitter into a size component and a phase component. In this case, the signal divider 301 outputs the size component to the bias modulator 310 and to the pulse generator 303, and outputs the phase component to the frequency modulator 320. Here, since the signal divider 301 is configured to be included in the digital signal processor 300, the signal divider 301 divides the transmission signal into the size component and the phase component by using a digital signal. In another exemplary embodiment, the signal divider 301 may divide the transmission signal into the size component and the phase component by using an analog circuit.

The pulse generator 303 generates a pulse signal according to the size component supplied from the signal divider 301 and outputs it to the bias modulator 310. For example, the pulse generator 303 generates the pulse signal as shown in FIG. 4 according to the size component supplied from the signal divider 301.

Thereafter, if a slope of a size signal generated according to the size component is greater than 0, the pulse generator 303 generates a pulse signal having a high output and supplies it to a buck converter 315 of the bias modulator 310. On the contrary, if the slope of the size signal is smaller than 0, the pulse generator 303 generates a pulse signal having a low output and supplies it to the buck converter 315.

The bias modulator 310 comprises a size amplifier 311, an emitter follower 313, the buck converter 315 and an inductor 317.

The size amplifier 311 amplifies the size component supplied from the signal divider 301 and outputs it to the emitter follower 313.

The emitter follower 313 lowers an impedance characteristic of a signal supplied from the size amplifier 311 by using a current supplied from the buck converter 315 as a drain bias and outputs the signal having a lowered impedance characteristic. That is, the emitter follower 313 lowers the impedance characteristic of the output voltage, thereby reducing an impedance characteristic in a modulation frequency band of the high efficiency amplifier. Accordingly, the high efficiency amplifier 340 can reduce a memory effect generated due to an impedance difference in the modulation frequency band.

The buck converter 315 selectively supplies a current to the emitter follower 313 according to the pulse signal supplied from the pulse generator 303. For example, if a high signal is input from the pulse generator 303, the buck converter 315 supplies a power supply current $V_{DD}$ to the emitter follower 313 so that the high efficiency amplifier 340 can restore a peak to average ratio (PAR) of the transmission signal. That is, the buck converter 315 supplies a current to the emitter follower 313 by switching to be connected to the power supply current $V_{DD}$ during a period in which the size component is increasing, i.e., a period in which a high signal is input and thereby enhances an efficiency of the size amplifier 311.

If a low signal is input from the pulse generator 303, the buck converter 315 does not supply a current $V_{DD}$ to the emitter follower 313 in order to enhance an efficiency of the EER power transmitter. That is, the buck converter 315 switches to be connected to ground GND and supplies only the current stored in the inductor 317 to the emitter follower 313 during a period in which the size component is decreasing, i.e., a period in which a low signal is input.

Accordingly, the bias modulator 310 amplifies a signal of low output voltage by using the size amplifier 311 and amplifies a signal of high output voltage by using the power supply current supplied from the buck converter 315.

The RF choke 330 connects the bias modulator 310 to the high efficiency amplifier 340 so that the high efficiency amplifier 340 can use the signal output from the bias modulator 310 as a bias voltage. In this case, the RF choke 330 is configured as an inductor to prevent the RF signal of the high efficiency amplifier 340 from flowing into the bias modulator 310.

The frequency modulator 320 comprises an orthogonal modulator 321 and a local oscillator 323.

The orthogonal modulator 321 modulates the phase component supplied from the signal divider 301 into an RF signal according to an RF sub-carrier supplied from the local oscillator 323.

The local oscillator 323 generates the RF sub-carrier for modulating the phase component into the RF signal in the orthogonal modulator 321.

The high efficiency amplifier 340 amplifies and outputs the RF signal supplied from the frequency modulator 320 by using the size signal supplied from the bias modulator 310 as an output bias voltage. In this case, since the high efficiency amplifier 340 amplifies the RF signal of the phase component supplied from the frequency modulator 320, it can amplify the RF signal without distortion from the high efficiency amplifier 340 itself. In addition, the high efficiency amplifier 340 amplifies the phase component supplied from the frequency modulator 320 by using the size information supplied from the bias modulator 310 as a bias voltage. Therefore, it can restore the transmission signal, the size component of which is amplified.

In the above-described exemplary embodiment, an EER power transmitter lowers the impedance characteristic in the modulation frequency band of the high efficiency amplifier by using the source follower or the emitter follower. In this case, to enhance an efficiency of the size amplifier, the EER power transmitter selectively supplies the power supply current $V_{DD}$ to the source follower or to the emitter follower according to a slope of the size component by using the buck converter. That is, if a slope of the size component is increased, the EER power transmitter supplies a power supply current, to amplify the signal requiring high voltage of the size components by using the buck converter. Therefore, it can enhance an efficiency of the size amplifier.

In another exemplary embodiment, the EER power transmitter may supply a fixed current to the source follower or to the emitter follower.

As described above, by lowering an impedance characteristic of a bias voltage using a source follower or an emitter follower and by selectively supplying a power supply current according to a slope of a size component, the EER power transmitter in a wireless communication system can reduce a memory effect by removing a capacitor for lowering an output impedance of a transformer for preventing a leakage of an RF signal in a power amplifier having high output voltage, and enhance an efficiency of the size amplifier.

Although the present disclosure has been described with reference to exemplary embodiments thereof, various changes and modifications may be suggested to one skilled in the art. It is intended that the present disclosure encompass such changes and modifications as fall within the scope of the appended claims and their equivalents.

What is claimed is:

1. A power transmission apparatus in a wireless communication system, comprising:
   a signal processor for dividing a transmission signal into a size component and a phase component and for generating a control signal according to the size component;
   a bias modulator for amplifying the size component according to the control signal supplied from the signal processor, for lowering an impedance characteristic of the amplified size component and for outputting the amplified size component;
   a frequency modulator for modulating the phase component into a radio frequency (RF) signal; and
   a power amplifier for amplifying the RF signal by using an output signal of the bias modulator as a bias voltage.

2. The apparatus of claim 1, wherein the signal processor comprises:
   a signal divider for dividing the signal into the size component and the phase component; and
   a signal generator for generating the control signal according to the size component.

3. The apparatus of claim 2, wherein the signal generator generates a pulse signal according to a slope of the size component.

4. The apparatus of claim 2, wherein the signal generator generates a signal for controlling a power supply current to be supplied to the bias modulator if the slope of the size component is greater than 0, and generates a signal for controlling a power supply current not to be supplied to the bias modulator if the slope of the size component is smaller than 0.

5. The apparatus of claim 1, wherein the signal processor comprises at least one of a digital signal processor and an analog circuit.

6. The apparatus of claim 1, wherein the bias modulator comprises:
   a size amplifier for amplifying the size component; and
   a buck converter for selectively supplying a power supply current to a source follower according to a control of the signal processor,
   wherein the source follower lowers an impedance of the amplified size component supplied from the size amplifier by using a current supplied from the buck converter as a drain bias and outputs the amplified size component.

7. The apparatus of claim 6, wherein the buck converter supplies a power supply current to the source follower if the slope of the size component is greater than 0 according to a control of the signal processor, and supplies a current stored in an inductor to the source follower if the slope of the size component is smaller than 0 according to a control of the signal processor.

8. The apparatus of claim 1, wherein the bias modulator comprises:
   a size amplifier for amplifying the size component; and
   a buck converter for selectively supplying a power supply current to an emitter follower according to a control of the signal processor,
   wherein the emitter follower lowers an impedance of the amplified size component supplied from the size amplifier by using a current supplied from the buck converter as a drain bias and outputs the amplified size component.

9. The apparatus of claim 8, wherein the buck converter supplies a power supply current to the emitter follower if the slope of the size component is greater than 0 according to a control of the signal processor, and supplies a current stored in an inductor to the emitter follower if the slope of the size component is smaller than 0 according to a control of the signal processor.

10. The apparatus of claim 1, wherein the frequency modulator comprises:
   a local oscillator for supplying a radio frequency sub-carrier for modulating the phase component into a radio frequency signal; and
   an orthogonal modulator for modulating the phase component into the radio frequency signal by using the radio frequency sub-carrier.

11. The apparatus of claim 1, further comprising a radio frequency choke for supplying an output signal of the bias modulator as a bias voltage of the power amplifier.

12. The apparatus of claim 11, wherein the radio frequency choke comprises an inductor.

13. A power transmission apparatus in a wireless communication system comprising:
   a signal processor for dividing a transmission signal into a size component and a phase component;
   a bias modulator for amplifying the size component, for lowering an impedance characteristic of the amplified size component and for outputting the amplified size component;
   a frequency modulator for modulating the phase component into a radio frequency (RF) signal; and
   a power amplifier for amplifying the RF signal by using an output signal of the bias modulator as a bias voltage.

14. The apparatus of claim 13, wherein the signal processor comprises at least one of a digital signal processor and an analog circuit.

15. The apparatus of claim 13, wherein the bias modulator comprises:
   a size amplifier for amplifying the size component; and
   a source follower for lowering an impedance of the amplified size component supplied from the size amplifier and for outputting the amplified size component.

16. The apparatus of claim 13, wherein the bias modulator comprises:
   a size amplifier for amplifying the size component; and
   an emitter follower for lowering an impedance of the amplified size component supplied from the size amplifier and for outputting the amplified size component.

17. The apparatus of claim 13, wherein the frequency modulator comprises:
   a local oscillator for supplying a radio frequency sub-carrier for modulating the phase component into a radio frequency signal; and
   an orthogonal modulator for modulating the phase component into the radio frequency signal by using the radio frequency sub-carrier.

18. The apparatus of claim 13, further comprising a radio frequency choke for supplying an output signal of the bias modulator as a bias voltage of the power amplifier.

19. The apparatus of claim 18, wherein the radio frequency choke comprises an inductor.

20. A power transmission apparatus in a wireless communication system comprising:
   a signal processor for providing a size component and a phase component of a transmission signal and for providing a control signal;
   a bias modulator for amplifying the size component according to the control signal, for lowering an impedance characteristic of the amplified size component and for outputting the amplified size component;
   a frequency modulator for modulating the phase component into a radio frequency (RF) signal; and
   a power amplifier for amplifying the RF signal by using an output signal of the bias modulator as a bias voltage.

* * * * *